United States Patent
Eliaz et al.

(10) Patent No.: US 9,130,637 B2
(45) Date of Patent: Sep. 8, 2015

(54) COMMUNICATION METHODS AND SYSTEMS FOR NONLINEAR MULTI-USER ENVIRONMENTS

(71) Applicant: MagnaCom Ltd., Petach Tikva (IL)

(72) Inventors: Amir Eliaz, Moshav Ben Shemen (IL); Ilan Reuven, Ganey Tikva (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 14/600,310

(22) Filed: Jan. 20, 2015

(65) Prior Publication Data

US 2015/0207527 A1 Jul. 23, 2015

Related U.S. Application Data

(60) Provisional application No. 61/929,679, filed on Jan. 21, 2014.

(51) Int. Cl.
*H03D 1/04* (2006.01)
*H04B 1/10* (2006.01)

(52) U.S. Cl.
CPC .................................... *H04B 1/10* (2013.01)

(58) Field of Classification Search
USPC ......... 375/316, 340, 342, 346, 348, 350, 284; 455/63.1, 114.2
See application file for complete search history.

(56) References Cited

U.S. PATENT DOCUMENTS

| | | |
|---|---|---|
| 4,109,101 A | 8/1978 | Mitani |
| 4,135,057 A | 1/1979 | Bayless, Sr. et al. |
| 4,797,925 A | 1/1989 | Lin |
| 5,111,484 A | 5/1992 | Karabinis |
| 5,131,011 A | 7/1992 | Bergmans et al. |
| 5,202,903 A | 4/1993 | Okanoue |
| 5,249,200 A | 9/1993 | Chen et al. |

(Continued)

FOREIGN PATENT DOCUMENTS

| | | |
|---|---|---|
| WO | 2007/000495 A1 | 1/2007 |
| WO | 2012/092647 A1 | 7/2012 |
| WO | 2013/030815 A1 | 3/2013 |

OTHER PUBLICATIONS

Equalization: The Correction and Analysis of Degraded Signals, White Paper, Agilent Technologies, Ransom Stephens V1.0, Aug. 15, 2005 (12 pages).

(Continued)

*Primary Examiner* — Khanh C Tran
(74) *Attorney, Agent, or Firm* — McAndrews, Held & Malloy, Ltd.

(57) ABSTRACT

An electronic receiver comprises a nonlinear distortion modeling circuit and a nonlinear distortion compensation circuit. The nonlinear distortion modeling circuit is operable to determine a plurality of sets of nonlinear distortion model parameter values, where each of the sets of nonlinear distortion model parameter values representing nonlinear distortion experienced by signals received by the electronic receiver from a respective one a plurality of communication partners. The nonlinear distortion compensation circuit is operable to use the sets of nonlinear distortion model parameter values for processing of signals from the plurality of communication partners. Each of the sets of nonlinear distortion model parameter values may comprises a plurality of values corresponding to a plurality of signal powers. The sets of nonlinear distortion model parameters may be stored in a lookup table indexed by a signal strength parameter.

40 Claims, 10 Drawing Sheets

(56) References Cited

U.S. PATENT DOCUMENTS

| | | | |
|---|---|---|---|
| 5,283,813 A | 2/1994 | Shalvi et al. | |
| 5,291,516 A | 3/1994 | Dixon et al. | |
| 5,394,439 A | 2/1995 | Hemmati | |
| 5,432,822 A | 7/1995 | Kaewell, Jr. | |
| 5,459,762 A | 10/1995 | Wang et al. | |
| 5,590,121 A | 12/1996 | Geigel et al. | |
| 5,602,507 A | 2/1997 | Suzuki | |
| 5,757,855 A | 5/1998 | Strolle et al. | |
| 5,784,415 A | 7/1998 | Chevillat et al. | |
| 5,818,653 A | 10/1998 | Park et al. | |
| 5,886,748 A | 3/1999 | Lee | |
| 5,889,823 A | 3/1999 | Agazzi et al. | |
| 5,915,213 A | 6/1999 | Iwatsuki et al. | |
| 5,930,309 A | 7/1999 | Knutson et al. | |
| 6,009,120 A | 12/1999 | Nobakht | |
| 6,167,079 A | 12/2000 | Kinnunen et al. | |
| 6,233,709 B1 | 5/2001 | Zhang et al. | |
| 6,272,173 B1 | 8/2001 | Hatamian | |
| 6,335,954 B1 | 1/2002 | Bottomley et al. | |
| 6,356,586 B1 | 3/2002 | Krishnamoorthy et al. | |
| 6,516,025 B1 | 2/2003 | Warke et al. | |
| 6,516,437 B1 | 2/2003 | Van Stralen et al. | |
| 6,532,256 B2 | 3/2003 | Miller | |
| 6,535,549 B1 | 3/2003 | Scott et al. | |
| 6,591,090 B1 | 7/2003 | Vuorio et al. | |
| 6,690,754 B1 | 2/2004 | Haratsch et al. | |
| 6,697,441 B1 | 2/2004 | Bottomley et al. | |
| 6,785,342 B1 | 8/2004 | Isaksen et al. | |
| 6,871,208 B1 | 3/2005 | Guo et al. | |
| 6,968,021 B1 | 11/2005 | White et al. | |
| 6,985,709 B2 | 1/2006 | Perets | |
| 7,158,324 B2 | 1/2007 | Stein et al. | |
| 7,190,288 B2 | 3/2007 | Robinson et al. | |
| 7,190,721 B2 | 3/2007 | Garrett | |
| 7,205,798 B1 | 4/2007 | Agarwal et al. | |
| 7,206,363 B2 | 4/2007 | Hegde et al. | |
| 7,215,716 B1 | 5/2007 | Smith | |
| 7,269,205 B2 | 9/2007 | Wang | |
| 7,467,338 B2 | 12/2008 | Saul | |
| 7,830,854 B1 | 11/2010 | Sarkar et al. | |
| 7,974,230 B1 | 7/2011 | Talley et al. | |
| 8,005,170 B2 | 8/2011 | Lee et al. | |
| 8,059,737 B2 | 11/2011 | Yang | |
| 8,175,186 B1 | 5/2012 | Wiss et al. | |
| 8,199,804 B1 | 6/2012 | Cheong | |
| 8,248,975 B2 | 8/2012 | Fujita et al. | |
| 8,351,536 B2 | 1/2013 | Mazet et al. | |
| 8,422,589 B2 | 4/2013 | Golitschek Edler Von Elbwart et al. | |
| 8,432,987 B2 | 4/2013 | Siti et al. | |
| 8,498,591 B1 | 7/2013 | Qian et al. | |
| 8,526,523 B1 | 9/2013 | Eliaz | |
| 8,548,072 B1 | 10/2013 | Eliaz | |
| 8,548,089 B2 | 10/2013 | Agazzi et al. | |
| 8,548,097 B1 | 10/2013 | Eliaz | |
| 8,553,821 B1 | 10/2013 | Eliaz | |
| 8,559,494 B1 | 10/2013 | Eliaz | |
| 8,559,496 B1 | 10/2013 | Eliaz | |
| 8,559,498 B1 | 10/2013 | Eliaz | |
| 8,565,363 B1 | 10/2013 | Eliaz | |
| 8,566,687 B1 | 10/2013 | Eliaz | |
| 8,571,131 B1 | 10/2013 | Eliaz | |
| 8,571,146 B1 | 10/2013 | Eliaz | |
| 8,572,458 B1 | 10/2013 | Eliaz | |
| 8,582,637 B1 | 11/2013 | Eliaz | |
| 8,599,914 B1 | 12/2013 | Eliaz | |
| 8,605,832 B1 | 12/2013 | Eliaz | |
| 8,665,941 B1 | 3/2014 | Eliaz | |
| 8,665,992 B1 | 3/2014 | Eliaz | |
| 8,666,000 B2 | 3/2014 | Eliaz | |
| 8,675,769 B1 | 3/2014 | Eliaz | |
| 8,675,782 B2 | 3/2014 | Eliaz | |
| 8,681,889 B1 | 3/2014 | Eliaz | |
| 8,731,413 B1 | 5/2014 | Dave et al. | |
| 8,737,458 B2 | 5/2014 | Eliaz | |
| 8,744,003 B2 | 6/2014 | Eliaz | |
| 8,781,008 B2 | 7/2014 | Eliaz | |
| 8,804,879 B1 | 8/2014 | Eliaz | |
| 8,811,548 B2 | 8/2014 | Eliaz | |
| 8,824,572 B2 | 9/2014 | Eliaz | |
| 8,824,599 B1 | 9/2014 | Eliaz | |
| 8,824,611 B2 | 9/2014 | Eliaz | |
| 8,831,124 B2 | 9/2014 | Eliaz | |
| 8,842,778 B2 | 9/2014 | Eliaz | |
| 8,873,612 B1 | 10/2014 | Eliaz | |
| 8,885,698 B2 | 11/2014 | Eliaz | |
| 8,885,786 B2 | 11/2014 | Eliaz | |
| 8,891,701 B1 | 11/2014 | Eliaz | |
| 8,897,387 B1 | 11/2014 | Eliaz | |
| 8,897,405 B2 | 11/2014 | Eliaz | |
| 8,948,321 B2 | 2/2015 | Eliaz | |
| 8,972,836 B2 | 3/2015 | Eliaz | |
| 8,976,853 B2 | 3/2015 | Eliaz | |
| 8,976,911 B2 | 3/2015 | Eliaz | |
| 8,982,984 B2 | 3/2015 | Eliaz | |
| 8,989,249 B2 | 3/2015 | Zerbe et al. | |
| 9,003,258 B2 | 4/2015 | Eliaz | |
| 2001/0008542 A1 | 7/2001 | Wiebke et al. | |
| 2002/0016938 A1 | 2/2002 | Starr | |
| 2002/0123318 A1 | 9/2002 | Lagarrigue | |
| 2002/0150065 A1 | 10/2002 | Ponnekanti | |
| 2002/0150184 A1 | 10/2002 | Hafeez et al. | |
| 2002/0172297 A1 | 11/2002 | Ouchi et al. | |
| 2003/0016741 A1 | 1/2003 | Sasson et al. | |
| 2003/0132814 A1 | 7/2003 | Nyberg | |
| 2003/0135809 A1 | 7/2003 | Kim | |
| 2003/0210352 A1 | 11/2003 | Fitzsimmons et al. | |
| 2004/0009783 A1 | 1/2004 | Miyoshi | |
| 2004/0037374 A1 | 2/2004 | Gonikberg | |
| 2004/0081259 A1 | 4/2004 | Ammer et al. | |
| 2004/0086276 A1 | 5/2004 | Lenosky | |
| 2004/0120409 A1 | 6/2004 | Yasotharan et al. | |
| 2004/0142666 A1 | 7/2004 | Creigh et al. | |
| 2004/0170228 A1 | 9/2004 | Vadde | |
| 2004/0174937 A1 | 9/2004 | Ungerboeck | |
| 2004/0203458 A1 | 10/2004 | Nigra | |
| 2004/0227570 A1 | 11/2004 | Jackson et al. | |
| 2004/0240578 A1 | 12/2004 | Thesling | |
| 2004/0257955 A1 | 12/2004 | Yamanaka | |
| 2005/0032472 A1 | 2/2005 | Jiang et al. | |
| 2005/0047517 A1 | 3/2005 | Georgios et al. | |
| 2005/0089125 A1 | 4/2005 | Zhidkov | |
| 2005/0123077 A1 | 6/2005 | Kim | |
| 2005/0135472 A1 | 6/2005 | Higashino | |
| 2005/0163252 A1 | 7/2005 | McCallister et al. | |
| 2005/0193318 A1 | 9/2005 | Okumura et al. | |
| 2005/0220218 A1 | 10/2005 | Jensen et al. | |
| 2005/0265470 A1 | 12/2005 | Kishigami et al. | |
| 2005/0276317 A1 | 12/2005 | Jeong et al. | |
| 2006/0067396 A1 | 3/2006 | Christensen | |
| 2006/0109780 A1 | 5/2006 | Fechtel | |
| 2006/0109935 A1 | 5/2006 | McQueen et al. | |
| 2006/0171489 A1 | 8/2006 | Ghosh et al. | |
| 2006/0203943 A1 | 9/2006 | Scheim et al. | |
| 2006/0239339 A1 | 10/2006 | Brown et al. | |
| 2006/0245765 A1 | 11/2006 | Elahmadi et al. | |
| 2006/0280113 A1 | 12/2006 | Huo | |
| 2007/0047121 A1 | 3/2007 | Eleftheriou et al. | |
| 2007/0092017 A1 | 4/2007 | Abedi | |
| 2007/0098059 A1 | 5/2007 | Ives et al. | |
| 2007/0098090 A1 | 5/2007 | Ma et al. | |
| 2007/0098116 A1 | 5/2007 | Kim et al. | |
| 2007/0110177 A1 | 5/2007 | Molander et al. | |
| 2007/0110191 A1 | 5/2007 | Kim et al. | |
| 2007/0127608 A1 | 6/2007 | Scheim et al. | |
| 2007/0136018 A1* | 6/2007 | Fernandez et al. | 702/86 |
| 2007/0140330 A1 | 6/2007 | Allpress et al. | |
| 2007/0189404 A1 | 8/2007 | Baum et al. | |
| 2007/0213087 A1 | 9/2007 | Laroia et al. | |
| 2007/0230593 A1 | 10/2007 | Eliaz et al. | |
| 2007/0258517 A1 | 11/2007 | Rollings et al. | |
| 2007/0291719 A1 | 12/2007 | Demirhan et al. | |
| 2008/0002789 A1 | 1/2008 | Jao et al. | |
| 2008/0049598 A1 | 2/2008 | Ma et al. | |

(56) References Cited

U.S. PATENT DOCUMENTS

| | | |
|---|---|---|
| 2008/0080644 A1 | 4/2008 | Batruni |
| 2008/0130716 A1 | 6/2008 | Cho et al. |
| 2008/0130788 A1 | 6/2008 | Copeland |
| 2008/0159377 A1 | 7/2008 | Allpress et al. |
| 2008/0207143 A1 | 8/2008 | Skarby et al. |
| 2008/0260985 A1 | 10/2008 | Shirai et al. |
| 2009/0003425 A1 | 1/2009 | Shen et al. |
| 2009/0028234 A1 | 1/2009 | Zhu |
| 2009/0058521 A1* | 3/2009 | Fernandez .................... 330/149 |
| 2009/0075590 A1 | 3/2009 | Sahinoglu et al. |
| 2009/0086808 A1 | 4/2009 | Liu et al. |
| 2009/0115513 A1 | 5/2009 | Hongo et al. |
| 2009/0122854 A1 | 5/2009 | Zhu et al. |
| 2009/0135972 A1* | 5/2009 | Tanaka et al. ................. 375/346 |
| 2009/0137212 A1 | 5/2009 | Belotserkovsky |
| 2009/0144059 A1* | 6/2009 | Yu et al. ..................... 704/256.1 |
| 2009/0185612 A1 | 7/2009 | McKown |
| 2009/0213908 A1 | 8/2009 | Bottomley |
| 2009/0220034 A1 | 9/2009 | Ramprashad et al. |
| 2009/0222262 A1* | 9/2009 | Kim et al. ..................... 704/231 |
| 2009/0245226 A1 | 10/2009 | Robinson et al. |
| 2009/0245401 A1 | 10/2009 | Chrabieh et al. |
| 2009/0290620 A1 | 11/2009 | Tzannes et al. |
| 2009/0323841 A1 | 12/2009 | Clerckx et al. |
| 2010/0002692 A1 | 1/2010 | Bims |
| 2010/0034253 A1 | 2/2010 | Cohen |
| 2010/0039100 A1 | 2/2010 | Sun et al. |
| 2010/0062705 A1 | 3/2010 | Rajkotia et al. |
| 2010/0074349 A1 | 3/2010 | Hyllander et al. |
| 2010/0158085 A1 | 6/2010 | Khayrallah |
| 2010/0166050 A1 | 7/2010 | Aue |
| 2010/0172309 A1 | 7/2010 | Forenza et al. |
| 2010/0202505 A1 | 8/2010 | Yu et al. |
| 2010/0202507 A1 | 8/2010 | Allpress et al. |
| 2010/0203854 A1 | 8/2010 | Yu et al. |
| 2010/0208774 A1 | 8/2010 | Guess et al. |
| 2010/0208832 A1 | 8/2010 | Lee et al. |
| 2010/0215107 A1 | 8/2010 | Yang |
| 2010/0220825 A1 | 9/2010 | Dubuc et al. |
| 2010/0278288 A1 | 11/2010 | Panicker et al. |
| 2010/0283540 A1 | 11/2010 | Davies |
| 2010/0284481 A1 | 11/2010 | Murakami et al. |
| 2010/0309796 A1 | 12/2010 | Khayrallah |
| 2010/0329325 A1 | 12/2010 | Mobin et al. |
| 2011/0051864 A1 | 3/2011 | Chalia et al. |
| 2011/0064171 A1 | 3/2011 | Huang et al. |
| 2011/0069791 A1 | 3/2011 | He |
| 2011/0074500 A1 | 3/2011 | Bouillet et al. |
| 2011/0074506 A1 | 3/2011 | Kleider et al. |
| 2011/0075745 A1 | 3/2011 | Kleider et al. |
| 2011/0090986 A1 | 4/2011 | Kwon et al. |
| 2011/0095819 A1* | 4/2011 | Velazquez .................... 330/149 |
| 2011/0134899 A1 | 6/2011 | Jones, IV et al. |
| 2011/0150064 A1 | 6/2011 | Kim et al. |
| 2011/0164492 A1 | 7/2011 | Ma et al. |
| 2011/0170630 A1 | 7/2011 | Silverman et al. |
| 2011/0182329 A1 | 7/2011 | Wehinger |
| 2011/0188550 A1 | 8/2011 | Wajcer et al. |
| 2011/0228869 A1 | 9/2011 | Barsoum et al. |
| 2011/0243266 A1 | 10/2011 | Roh |
| 2011/0249709 A1 | 10/2011 | Shiue et al. |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0025909 A1 | 2/2012 | Jo et al. |
| 2012/0027132 A1 | 2/2012 | Rouquette |
| 2012/0051464 A1 | 3/2012 | Kamuf et al. |
| 2012/0106617 A1 | 5/2012 | Jao et al. |
| 2012/0120990 A1* | 5/2012 | Koren et al. ................... 375/219 |
| 2012/0163489 A1 | 6/2012 | Ramakrishnan |
| 2012/0177138 A1 | 7/2012 | Chrabieh et al. |
| 2012/0207248 A1 | 8/2012 | Ahmed et al. |
| 2013/0028299 A1 | 1/2013 | Tsai |
| 2013/0044877 A1 | 2/2013 | Liu et al. |
| 2013/0077563 A1 | 3/2013 | Kim et al. |
| 2013/0121257 A1 | 5/2013 | He et al. |
| 2013/0343480 A1 | 12/2013 | Eliaz |
| 2013/0343487 A1 | 12/2013 | Eliaz |
| 2014/0036986 A1 | 2/2014 | Eliaz |
| 2014/0056387 A1 | 2/2014 | Asahina |
| 2014/0098841 A2 | 4/2014 | Song et al. |
| 2014/0098907 A1 | 4/2014 | Eliaz |
| 2014/0098915 A1 | 4/2014 | Eliaz |
| 2014/0105267 A1 | 4/2014 | Eliaz |
| 2014/0105268 A1 | 4/2014 | Eliaz |
| 2014/0105332 A1 | 4/2014 | Eliaz |
| 2014/0105334 A1 | 4/2014 | Eliaz |
| 2014/0108892 A1 | 4/2014 | Eliaz |
| 2014/0133540 A1 | 5/2014 | Eliaz |
| 2014/0140388 A1 | 5/2014 | Eliaz |
| 2014/0140446 A1 | 5/2014 | Eliaz |
| 2014/0146911 A1 | 5/2014 | Eliaz |
| 2014/0161158 A1 | 6/2014 | Eliaz |
| 2014/0161170 A1 | 6/2014 | Eliaz |
| 2014/0198255 A1 | 7/2014 | Kegasawa |
| 2014/0241477 A1 | 8/2014 | Eliaz |
| 2014/0247904 A1 | 9/2014 | Eliaz |
| 2014/0269861 A1 | 9/2014 | Eliaz |
| 2014/0286459 A1* | 9/2014 | Eliaz et al. .................... 375/340 |
| 2014/0301507 A1 | 10/2014 | Eliaz |
| 2014/0321525 A1 | 10/2014 | Eliaz |
| 2014/0328428 A1 | 11/2014 | Eliaz |
| 2014/0376358 A1 | 12/2014 | Eder et al. |
| 2015/0010108 A1 | 1/2015 | Eliaz |
| 2015/0049843 A1 | 2/2015 | Reuven et al. |
| 2015/0055722 A1 | 2/2015 | Eliaz |
| 2015/0063499 A1 | 3/2015 | Eliaz |
| 2015/0070089 A1 | 3/2015 | Eliaz |
| 2015/0071389 A1 | 3/2015 | Eliaz |
| 2015/0078491 A1 | 3/2015 | Eliaz |

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •lu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

(56) References Cited

OTHER PUBLICATIONS

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.
Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.
S. Mita, M. Izumita, N. Doi, and Y. Eto, "Automatic equalizer for digital magnetic recording systems" IEEE Trans. Magn., vol. 25, pp. 3672-3674, 1987.
E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.
W. E. Ryan and A. Gutierrez, "Performance of adaptive Volterra equalizers on nonlinear magnetic recording channels," IEEE Trans. Magn., vol. 31, pp. 3054-3056, Nov. 1995.
X. Che, "Nonlinearity measurements and write precompensation studies for a PRML recording channel," IEEE Trans. Magn., vol. 31, pp. 3021-3026, Nov. 1995.
O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.
Miao, George J., Signal Processing for Digital Communications, 2006, Artech House, pp. 375-377.
Xiong, Fuqin. Digital Modulation Techniques, Artech House, 2006, Chapter 9, pp. 447-483.
Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).
Stefano Tomasin, et al. "Iterative Interference Cancellation and Channel Estimation for Mobile OFDM", IEEE Transactions on Wireless Communications, vol. 4, No. 1, Jan. 2005, pp. 238-245.
Int'l Search Report and Written Opinion for PCT/IB2013/01866 dated Mar. 21, 2014.
Int'l Search Report and Written Opinion for PCT/IB2013/001923 dated Mar. 21, 2014.
Int'l Search Report and Written Opinion for PCT/IB2013/001878 dated Mar. 21, 2014.
Int'l Search Report and Written Opinion for PCT/IB2013/002383 dated Mar. 21, 2014.
Int'l Search Report and Written Opinion for PCT/IB2013/01860 dated Mar. 21, 2014.
Int'l Search Report and Written Opinion for PCT/IB2013/01970 dated Mar. 27, 2014.
Int'l Search Report and Written Opinion for PCT/IB2013/01930 dated May 15, 2014.
Int'l Search Report and Written Opinion for PCT/IB2013/02081 dated May 22, 2014.
Al-Dhahir, Naofal et al., "MMSE Decision-Feedback Equalizers: Finite-Length Results" IEEE Transactions on Information Theory, vol. 41, No. 4, Jul. 1995.
Cioffi, John M. et al., "MMSE Decision-Feedback Equalizers and Coding—Park I: Equalization Results" IEEE Transactions on Communications, vol. 43, No. 10, Oct. 1995.
Eyuboglu, M. Vedat et al., "Reduced-State Sequence Estimation with Set Partitioning and Decision Feedback" IEEE Transactions onCommunications, vol. 36, No. 1, Jan. 1988.
Khaled M. Gharaibeh, Nonlinear Distortion in Wireless Systems, 2011, John Wiley & Sons, 2nd Edition, chapter 3, pp. 59-81.
Forney, G. David Jr., "Coset Codes—Part I: Introduction and Geometrical Classification" IEEE Transactions on Information Theory, vol. 34, No. 5, Sep. 1988.
Int'l Search Report and Written Opinion for PCT/IB2014/002449 dated Mar. 12, 2015.
Digital predistortion of power amplifiers for wireless applications (Doctoral dissertation, Georgia Institute of Technology). Retrieved from the internet <http://http://202.28.199.34/multim/3126235.pdf> Ding, L Mar. 31, 2005.
Digital predistortion for power amplifiers using separable functions. Signal Processing, IEEE Transactions on, 58(8), 4121-4130. Retrieved from the internet </http://arxiv.org/ftp/arxiv/papers/1306/1306.0037.pdf> Jiang, H., & Wilford, P.A. Aug. 8, 2010.
Digital predistortion linearization methods for RF power amplifiers. Teknillinen korkeakoulu. Retrieved from the Internet <http://lib.tkk.fi/Diss/2008/isbn9789512295463/isbn9789512295463.pdf> Teikari I. Sep. 30, 2008.
Kayhan, F., et al., Joint Signal-Labeling Optimization for Pragmatic Capacity under Peak-Power Constraint, 978-1-4244-5637, 2010.
Kayhan, F., et al., Constellation Design for Transmission over Nonlinear Satellite Channels, Oct. 5, 2012.

* cited by examiner

COMMUNICATION METHODS AND SYSTEMS FOR NONLINEAR MULTI-USER ENVIRONMENTS

PRIORITY CLAIM

This application claims priority to the following application(s), each of which is hereby incorporated herein by reference:

U.S. provisional patent application 61/929,679 titled "Communication Methods and Systems for Nonlinear Multiuser Environments" filed on Jan. 21, 2014.

INCORPORATION BY REFERENCE

The entirety of each of the following applications is hereby incorporated herein by reference:

U.S. patent application Ser. No. 14/481,108 titled "Adaptive Nonlinear Model Learning" filed on Sep. 9, 2014 and published as US2015/0070089.

BACKGROUND

Conventional communication methods and systems suffer severe performance degradation in the presence of nonlinear distortion. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods are provided for communications in nonlinear multi-user environments, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1A:
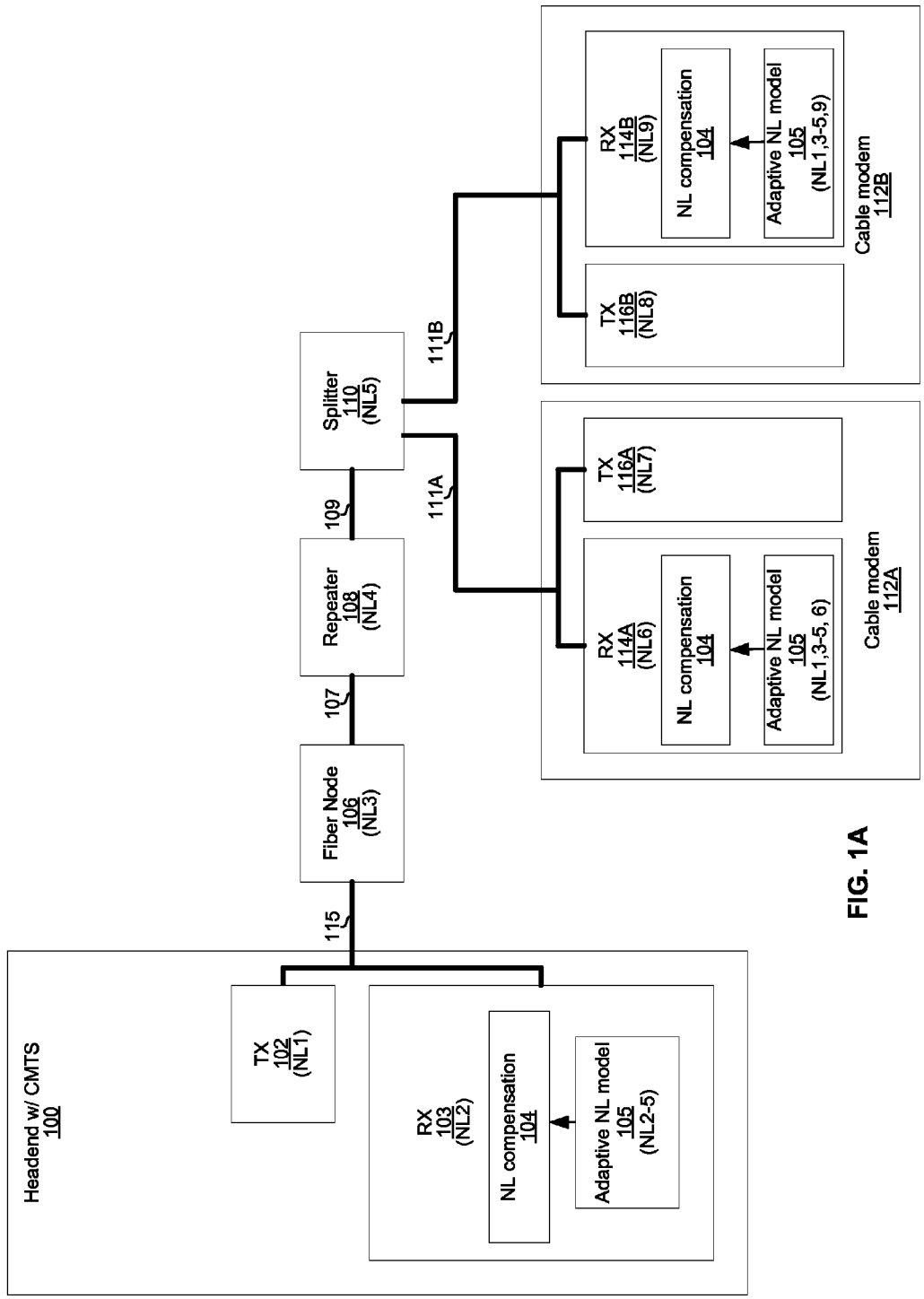
FIGS. 1A and 1B depict two example configurations of a cable television/DOCSIS network in which adaptive nonlinear distortion models are used for improving communication performance.
Figure 1B:
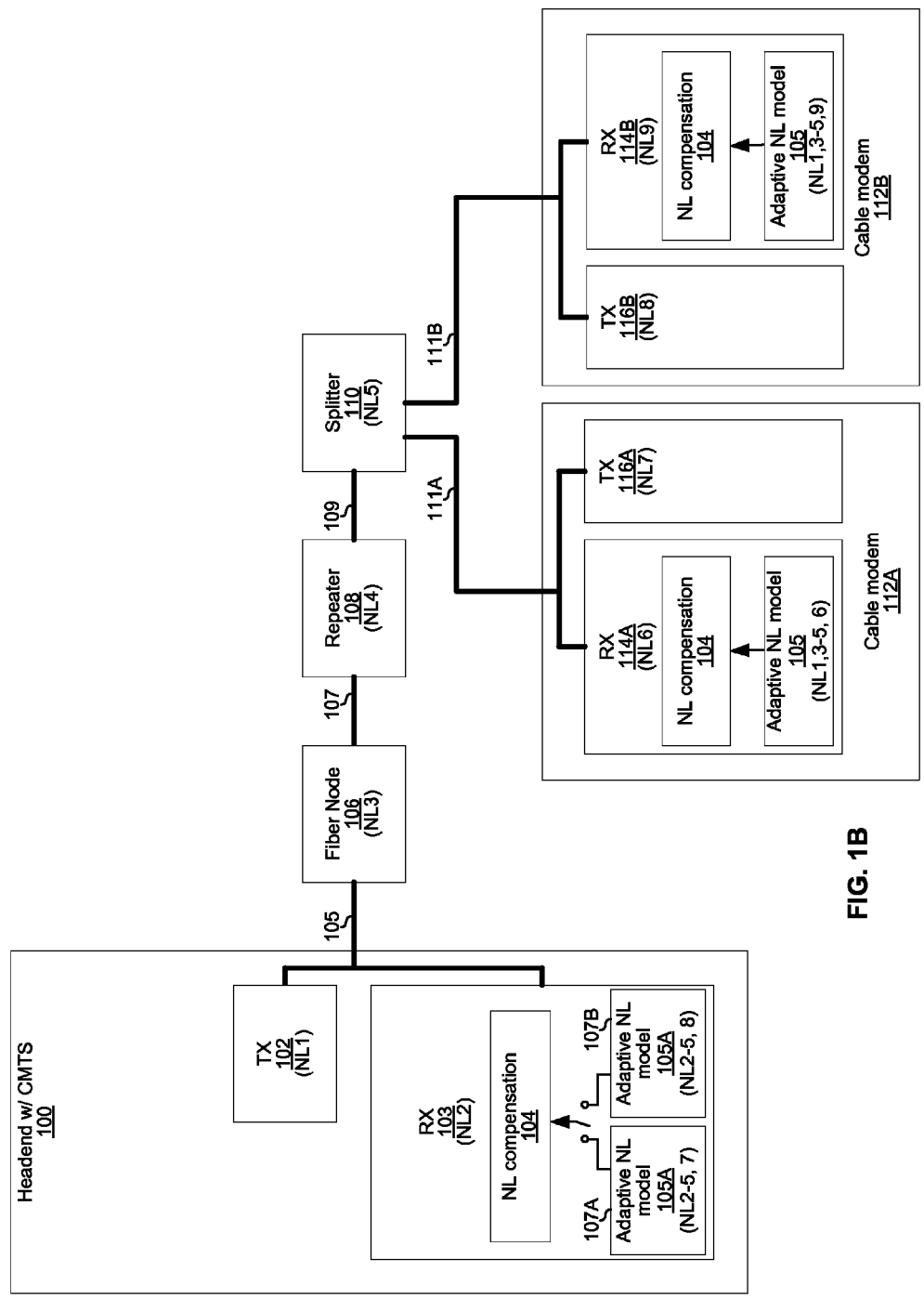

FIGS. 1A and 1B depict two example configurations of a cable television/DOCSIS network in which adaptive nonlinear distortion models are used for improving communication performance. In each of FIGS. 1A and 1B there is shown a headend with cable modem termination system (CMTS) 100 comprising a transmitter 102 and a receiver 103; a hybrid fiber-coaxial (HFC) network comprising a fiber optical cable 115, a fiber node 106, coaxial cable 107, a repeater 108, a coaxial cable 109, a splitter 110, and coaxial cables 111A and 111B; a cable modem 112A comprising a receiver 114A and a transmitter 116A; and a cable modem 112B comprising a transmitter 116B and a receiver 114B.

Nonlinear distortion introduced by the transmitter 102 is expressed as NL1, nonlinear distortion introduced by receiver 103 is expressed as NL2, nonlinear distortion introduced by the fiber node 106 is expressed as NL3 (for simplicity of illustration the nonlinear distortion introduced by fiber node '06 is assumed to be symmetric, but such symmetry need not be the case), nonlinear distortion introduced by the repeater 108 is expressed as NL4 (for simplicity of illustration the nonlinear distortion introduced by repeater 108 is assumed to be symmetric, but such symmetry need not be the case), nonlinear distortion introduced by the splitter 110 is expressed as NL5 (for simplicity of illustration the nonlinear distortion introduced by splitter 110 is assumed to be symmetric, but such symmetry need not be the case), nonlinear distortion introduced by the receiver 114A is expressed as NL6, nonlinear distortion introduced by the transmitter 116A is expressed as NL7, nonlinear distortion introduced by the transmitter 116B is expressed as NL8, and nonlinear distortion introduced by the receiver 114B is expressed as NL9. For simplicity of illustration, the cables 115, 107, 109, 111A, and 111B are assumed to exhibit linear performance, but such need not be the case.

Each of the receivers 103, 114A, and 114B comprises a nonlinear distortion compensation circuit 104 and an adaptive nonlinear distortion modeling circuit 105. Each of the modeling circuits 105 uses one or more nonlinear distortion models to estimate/reproduce the nonlinear distortion experienced by the traffic received via its respective receiver. A nonlinear distortion model used by circuit 105 may have one or more parameters associated with it which may be used for adapting the nonlinear distortion model to the particular circumstances. For example, a nonlinear distortion model may have a parameter ρ representing the AM/AM distortion and a parameter φ representing the AM/PM distortion. The values of these parameters to be used for any particular sample of a received signal may depend on the power of the particular sample. Which value of these parameters should be used for any particular power level may adapt over time based on error between the actual nonlinear distortion experienced by samples of the received signal and the estimated/reproduced nonlinear distortion. Accordingly, the parameters values may, for example, be stored in a lookup table indexed by transmit-device identifier (e.g., MAC addresses).

In an example implementation, each of the circuits 105 may be operable to use a plurality of nonlinear distortion models at any given time. In such an implementation, the nonlinear distortion modeling circuit 105 may, for example, be operable to select from among the plurality of distortion models based on which model works best (results in least error between actual and estimated nonlinear distortion) for any given signal at any given time. Which model works best for a given received signal may, for example, depend on the device from which the signal was received. Accordingly, nonlinear distortion model parameter values may, for example, be stored in a lookup table indexed by transmit-device identifier (e.g., MAC addresses of transmitters 116A and 116B).

Figure 7:
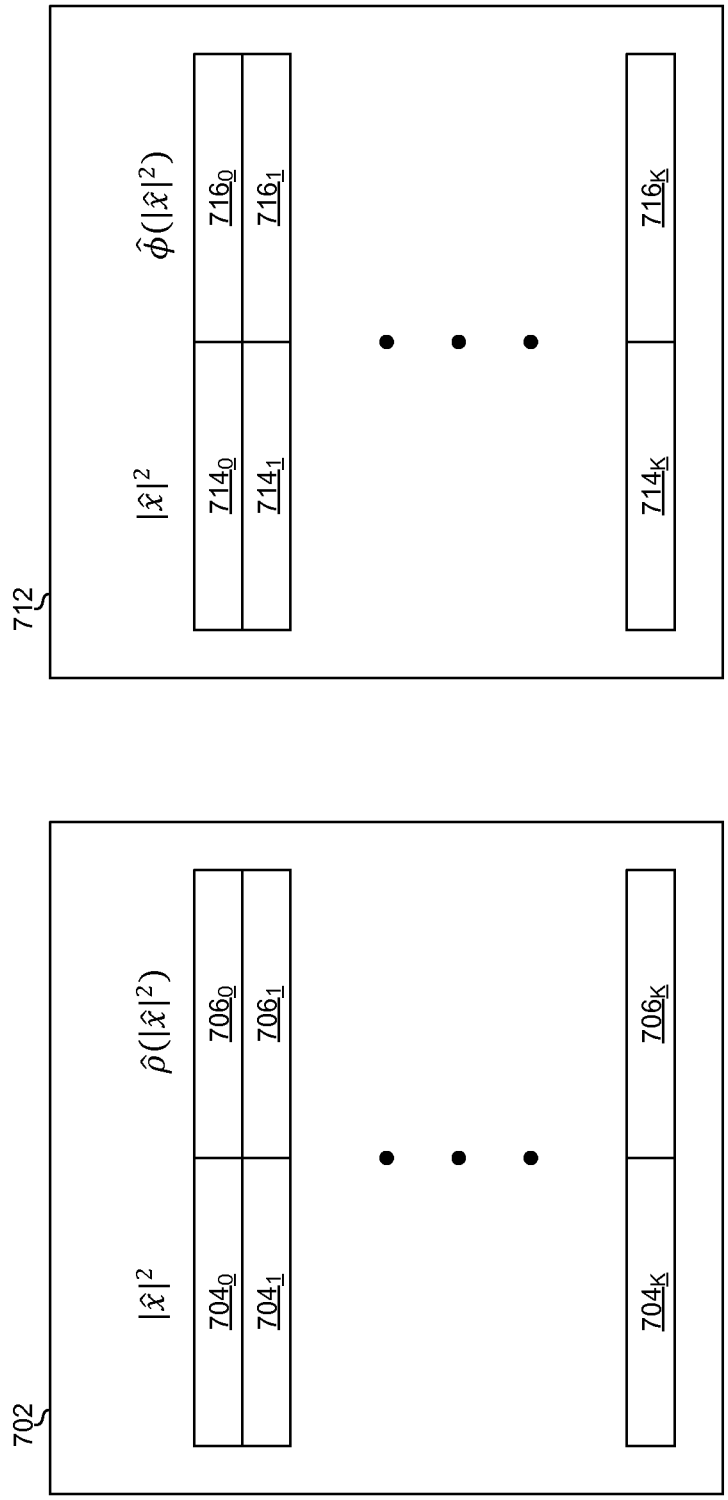
FIG. 7 depicts look-up tables of nonlinear distortion model parameter values.

For example, referring to FIG. 7, where both amplitude and phase distortion depend on instantaneous signal power, a combined AM/AM and AM/PM type distortion model may be used. Such a distortion model may be characterized by a signal power parameter, one or more AM/AM distortion parameters, and one or more AM/PM distortion parameters. Such a distortion model may be realized by, for example, two look-up tables (LUTs) 702 and 712 were the first LUT 702 maps a value of the signal power parameter to corresponding value(s) of the one or more AM/AM distortion parameter(s), and the second LUT 712 maps a value of the signal power parameter to corresponding value(s) of the one or more AM/PM distortion parameters. The lookup tables 702 and 712 thus hold a set of nonlinear distortion parameter values for a particular signal source (e.g., the tables 702 and 712 may reside in CMTS 100 and store parameter values for cable modem 112A). Although an example implementation using two separate LUTs is described here, the combined AM/AM and AM/PM may be realized using a single LUT that maps a signal power parameter to a complex valued representing both the AM/AM distortion parameter and the AM/PM distortion parameter.

Using the polar representation of a complex variable x:

$$x = |x| \cdot e^{j \angle(x)}, \quad (1)$$

where |x| stands for the absolute value (magnitude) of x and ∠(x) denotes the angle of x. The received distorted signal, y, resulting from transmitted signal x can be represented as (omitting time dependence for simplicity of notation (i.e., x=x(t), y=y(t))):

$$y = \rho(|x|^2) \cdot |x| \cdot e^{j[\angle(x) + \phi(|x|^2)]}, \quad (2)$$

where $\rho(|x|^2)$ and $\phi(|x|^2)$ represent the AM/AM and AM/PM distortion functions, respectively. In case that the nonlinear distortion is very small, y≅x and consequently $\rho(|x|^2) \approx 1$, $\phi(|x|^2) \approx 0$ for any x.

A reproduction or estimate of a received distorted signal (denoted ŷ) resulting from a transmitted signal x can be represented as:

$$\hat{y} = \hat{\rho}(|\hat{x}|)^2 \cdot |\hat{x}| \cdot e^{j[\angle(\hat{x}) + \hat{\phi}(|\hat{x}|^2)]} \quad (3)$$

where x̂ denotes an estimate of the transmitted signal prior to applying the nonlinear distortion model, $\hat{\rho}(|\hat{x}|^2)$ and $\hat{\phi}(|\hat{x}|^2)$ represent the estimations of $\rho(|x|^2)$ and $\phi(|x|^2)$ generated by the nonlinear distortion modeling circuit 105. The combined AM/AM and AM/PM type distortion model may thus be characterized by the signal power parameter $|\hat{x}|^2$, the AM/AM parameter $\hat{\rho}(|\hat{x}|^2)$, and the AM/PM parameter $\hat{\phi}(|\hat{x}|^2)$. Referring to FIG. 7, each entry k (for 0≤k≤K) of the first LUT 702 holds: (1) a specific signal power 704$_k$, and (2) the value of $\hat{\rho}(|\hat{x}|^2)$ (called out as 706$_k$) that corresponds to the specific signal power 704$_k$. Similarly, each entry k of the second LUT 712 holds: (1) the specific signal power 704$_k$; and (2) the value of $\hat{\phi}(|\hat{x}|^2)$ (called out as 716$_k$) corresponding to the specific signal power 704$_k$. For example, denoting the specific signal power for entry k=0 as $|\hat{x}_0|^2$, entry 0 of the first LUT may store $|\hat{x}_0|^2$ and $\hat{\rho}(|\hat{x}_0|^2)$ and the second LUT may store $|\hat{x}_0|^2$ and $\hat{\phi}(|\hat{x}_0|^2)$. In another example implementation, a signal power parameter other than $|\hat{x}|^2$ may be used and values thereof stored in fields 704$_0$ ... 704$_K$ of LUT 702 and fields 704$_0$ ... 704$_K$ of LUT 712. Such alternative signal power parameter may be, for example, a function of the signal level and/or phase such as delayed signal power level (such as delayed AM/PM), a function of signal power at other time instances (to support a nonlinear distortion model with memory), or a filtered (convolution) of signal instantaneous power samples.

Although FIG. 7 shows indexing parameter (the power parameter in the examples) as being stored in the lookup table, in another example implementation, the indexing parameter may not actually be stored but may simply be calculated and then mathematically and/or logically (e.g., through a hashing function) mapped to the memory address that holds the corresponding distortion parameter. An example of this is shown in FIG. 8 in which address generator maps values pf|x̂|² to the address in which the corresponding distortion parameter is stored.

Figure 8:
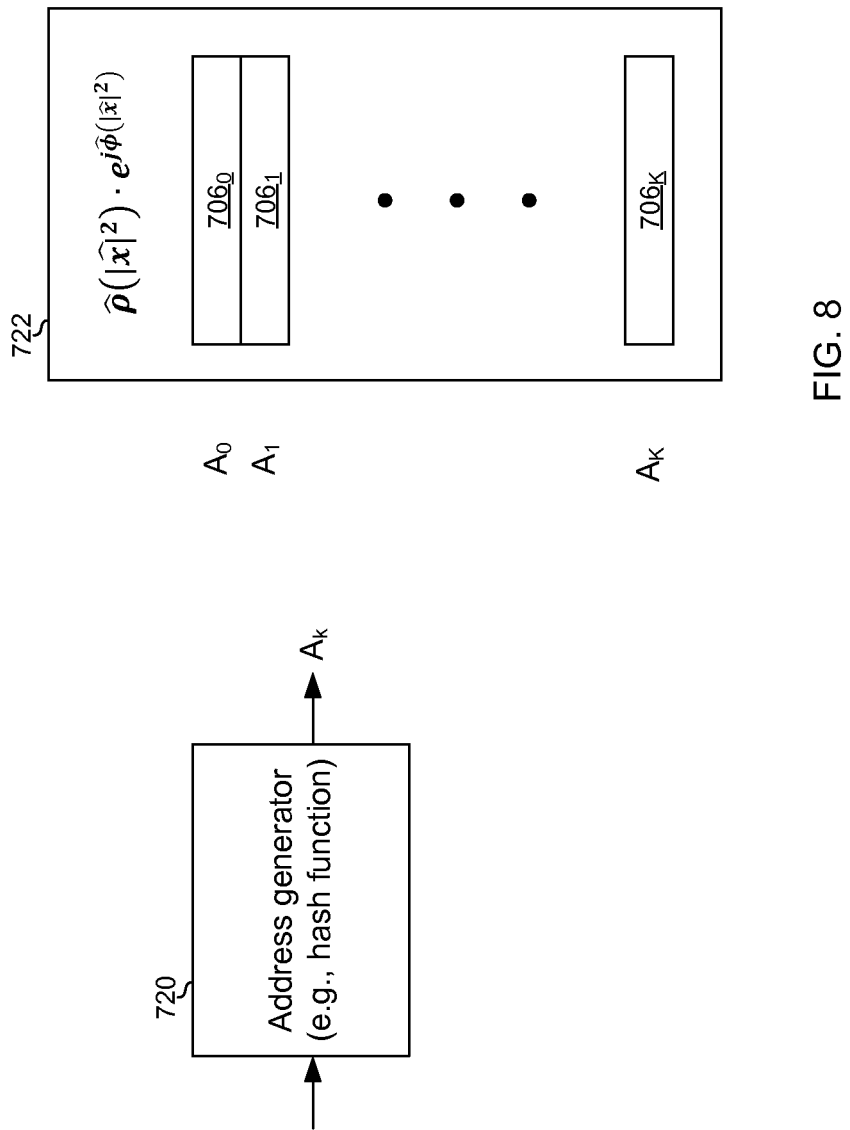
FIG. 8 depicts a look-up table of nonlinear distortion model parameter values.

In another example implementation, a single distortion parameter accounting for both AM/AM and AM/PM may be stored in the lookup table. In this regard, representing the reproduction or estimate of the received distorted signal as $$\hat{y} = \hat{x} \cdot \hat{\rho}(|\hat{x}|^2) \cdot e^{j\hat{\phi}(|\hat{x}|^2)}, \quad (4)$$

then $\hat{\rho}(|\hat{x}|^2) \cdot e^{j\hat{\phi}(|\hat{x}|^2)}$ can be stored as a single distortion parameter, as is shown in FIG. 8.

Returning to FIGS. 1A and 1B, modeling circuit 105 in receiver 114A attempts to estimate/reproduce the composite nonlinear distortion resulting from NL1, NL3, NL4, NL5, and NL6 that is seen by communications from the headend 100 to the receiver 114A.

In FIGS. 1A and 1B, modeling circuit 105 in receiver 114B attempts to estimate/reproduce the composite nonlinear distortion resulting from NL1, NL3, NL4, NL5, and NL9 that is seen by communications from the headend 100 to the receiver 114B.

In FIG. 1A, modeling circuit 105 in receiver 103 attempts to estimate/reproduce the composite nonlinear distortion resulting from NL2, NL3, NL4, and NL5—the nonlinearities which are common to traffic from the transmitter 116A and the transmitter 116B. In this configuration, although communications from TX 116A also experience NL7, and communications from TX 116B also experience NL8, NL7 and NL8 are ignored for purposes of simplifying nonlinear distortion estimation and compensation in the receiver 103.

In another example implementation, NL7 and NL8 may be very similar. This may be the case, for example, where cable modems 112A and 112B are the same make and model using the same power amplifier. In such an implementation, the nonlinearities may be expressed as NL7≅NL8≅NL7', and the adaptive nonlinear distortion modeling circuit 105 of receiver 104 may attempt to estimate/reproduce the composite nonlinear distortion resulting from NL1, N12, NL3, NL4, NL5, and NL7'. In another example, NL7' may be an average of NL7 and NL8 or may be the common terms (e.g., higher order terms) of NL7 and NL8, when NL7 and NL8 are expressed as polynomials.

In another example implementation, shown in FIG. 1B, the receiver 103 comprises multiple instances of circuit 105, with each instance of circuit 105 using a different sets of parameter values such that NL2, NL3, NL4, NL5, and NL7 are accounted for when receiving from TX 116A and NL2, NL3, NL4, NL5, and NL8 are accounted for when receiving from TX 116B. (It is noted that, although multiple instances of circuit 105 are shown for clarity of illustration, in practice it may be that a single instance of circuit 105 is operable to maintain multiple sets of parameter values.) As a non-limiting example: each of two instances of circuit 105 in receiver 103 use a nonlinear distortion model having parameter ρ, but the first instance of circuit 105 uses a first set of values for ρ, and the second instance of circuit 105 uses a second set of values for ρ. As another non-limiting example: there are two instances of circuit 105 and the first instance of circuit 105 uses a nonlinear distortion model having parameters ρ and φ, and the second instance of circuit 105 uses a nonlinear distortion model having parameters C1, C2, and C3. Thus, the first instance maintains a set of values for ρ and φ while the second instance of circuit 105 maintains a set of values of C1, C2, and C3. In this example implementation, the nonlinear distortion modeling circuit 105 of receiver 103 may be operable to select between the two sets of parameter values to choose the set of values that best estimates/reproduces the actual nonlinear distortion at any given time and for any given received signal.

In a network in which bandwidth is allocated by a central controller (e.g., by the CMTS in the DOCSIS network of FIGS. 1A and 1B or, as another example, by the network controller of a multimedia over coaxial alliance (MoCA) network), this switching may be enabled by the fact that the controller manages allocation of upstream bandwidth and thus knows which end systems are going to be transmitting at which times, and can load the appropriate set of parameter values accordingly.

In a network in which bandwidth is not managed by a central controller and, thus the source of a transmission is not known ahead of time, switching between sets of nonlinear distortion model parameter values may be done based on inspection of received transmissions. For example, each of the end-systems may send a unique identifier as part of a preamble. The identifier may be modulated and/or coded such that it can be reliably demodulated/decoded without aid of the NL compensation circuit 104 in the receiver 103. Upon identifying the source, the corresponding set of parameter values (which was previously determined) may be selected and NL compensation circuit 104 may use the selected parameter values for receiving the remainder of the transmission. The set of parameter values of the identified source may have been determined, for example, when the device was admitted to the network and/or during a training/update interval (e.g., triggered upon a change to the device or the network). For example, upon a device being admitted to the network probe/training signals may be used to estimate the set of nonlinearity model parameter values for that particular device.

In another example implementation, the nonlinearity for any particular device may not be stored but may be estimated anew each time a burst is received from the particular device. For example, each burst may carry a preamble whose signal characteristics are well suited for estimating the nonlinearity of the particular device.

For an OFDM system (e.g., DOCSIS 3.1) different subcarriers of any particular OFDM symbol may comprise transmissions from different end systems. Accordingly, selection of nonlinear distortion parameter values (i.e. selection between different nonlinear distortion models and/or selection between parameter values for a particular nonlinear distortion model) may be performed on a per-subcarrier (or per-group-of-subcarriers) basis and per-OFDM-symbol basis. In an example implementation, the parameters values used for any particular end system may be updated only on OFDM symbols carrying transmissions for that particular end system.

In an example implementation, each device in a network may, during initial connection setup as part of a handshaking routine to admit that device to the network (e.g., ranging, auto-negotiation, and/or the like), transmit a characterization of the nonlinear distortion introduced by its transmitter (e.g., a previously generated set of nonlinear model parameter values). For example, in FIGS. 1A and 1B, each of transmitter 102, fiber node 106, repeater 108, splitter 110, transmitter 116a, and transmitter 114b may transmit characterizations of the nonlinear distortion they introduce during connection setup.

In an example implementation, during a handshaking routine between a first device previously admitted to a network and a second device currently being admitted to the network (e.g., ranging, auto-negotiation, and/or the like), the first device may transmit training/probe signals which the second device can use to generate a set of nonlinear model parameter values to use for signals from the first device, and the second device may transmit training/probe signals which the first device can use to generate a set of nonlinear model parameter values to use for signals from the second device In another example implementation, a database of the devices of the HFC network, along with characterizations of the nonlinear distortion they introduce, may be maintained and accessible by devices connected to the HFC network. For example, upon installation, the cable modems 112A may query such a database to learn that it will be communicating with CMTS 100 via splitter 110, repeater 108, and fiber node 106. It may then retrieve NL1, NL3, NL4, and NL5 from the database.

Figure 2A:
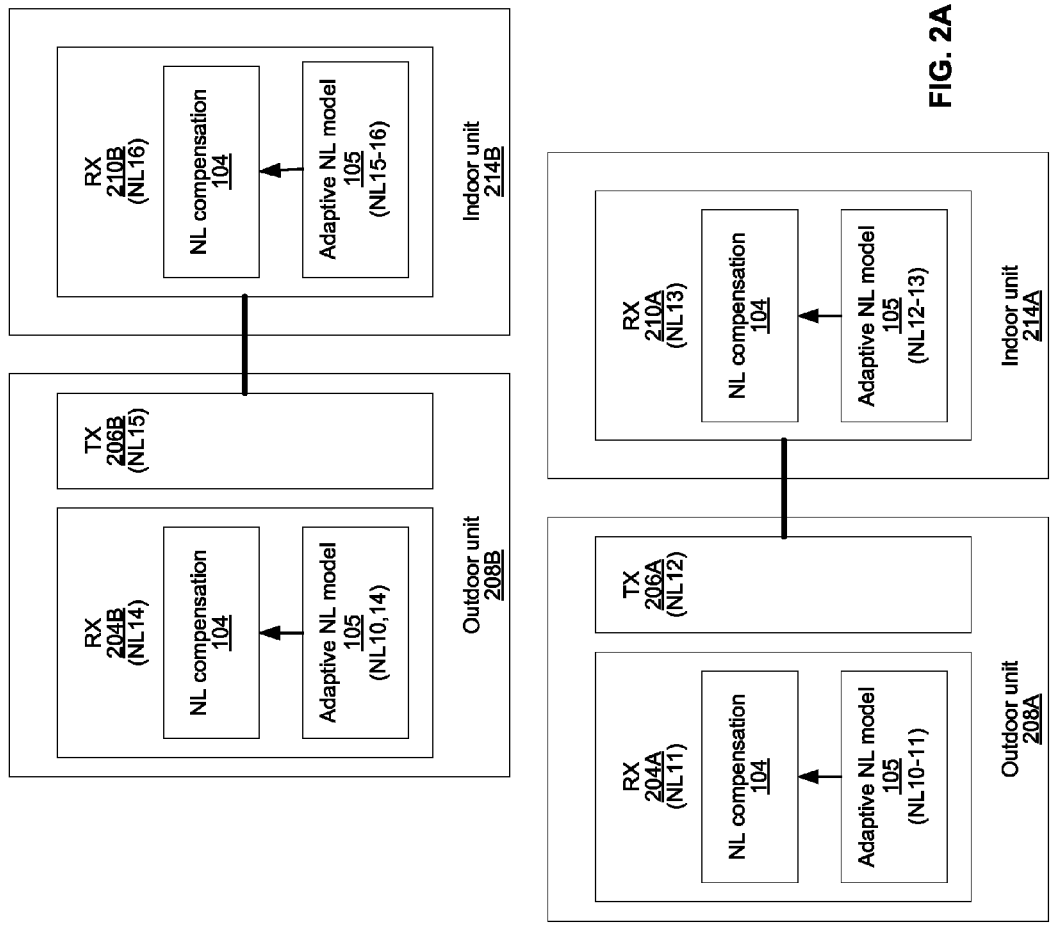
FIGS. 2A and 2B depict a direct broadcast satellite (DBS) network in which adaptive nonlinear distortion models are used for improving communication performance.
Figure 2A:
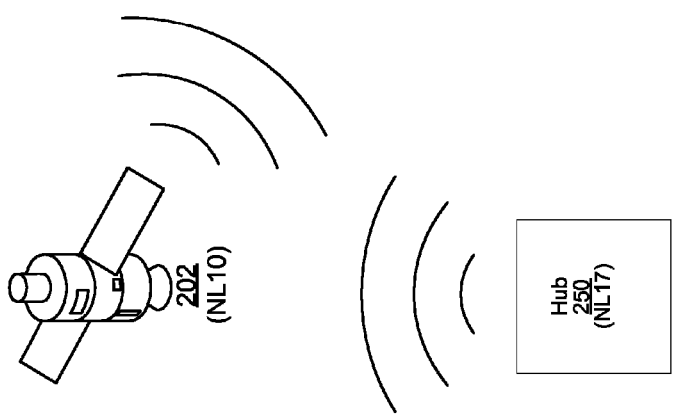
Figure 2B:
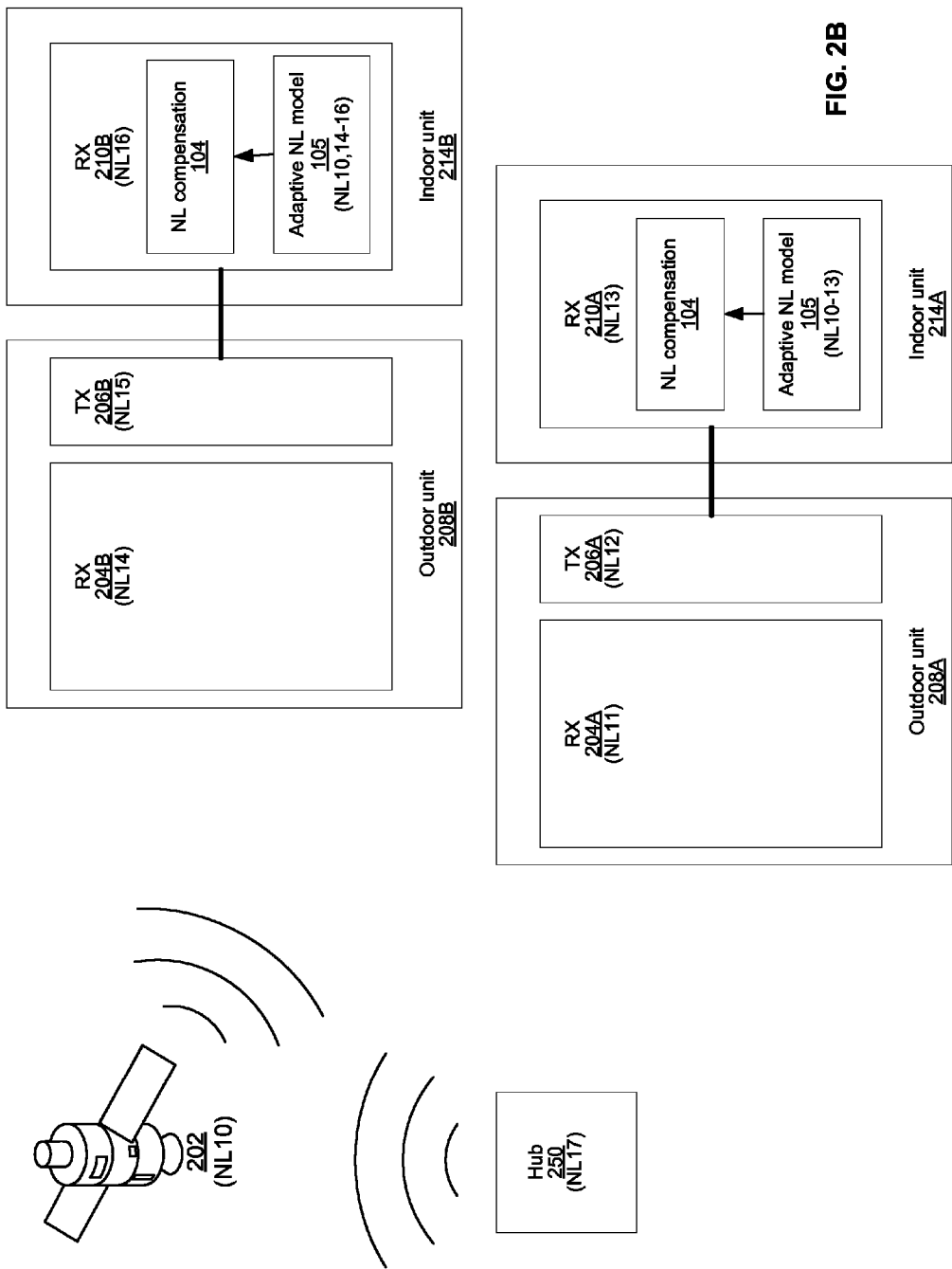

FIGS. 2A and 2B depict a direct broadcast satellite (DBS) network in which adaptive nonlinear distortion models are used for improving communication performance. Shown are satellite 202, two outdoor units (ODUs) 208A and 208B and their corresponding indoor units (IDUs) 214A and 214B. The ODU 208A comprises receiver 204A and transmitter 206A. The IDU 214A comprises receiver 210A. The ODU 208B comprises receiver 204B and transmitter 206B. The IDU 214B comprises receiver 210B.

Nonlinear distortion introduced by the satellite 202 is expressed as NL10. Nonlinear distortion introduced by receiver 204A is expressed as NL11. Nonlinear distortion introduced by transmitter 206A is expressed as NL12. Nonlinear distortion introduced by receiver 210A is expressed as NL13. Nonlinear distortion introduced by receiver 204B is expressed as NL14. Nonlinear distortion introduced by transmitter 206B is expressed as NL15. Nonlinear distortion introduced by receiver 210B is expressed as NL16.

In FIGS. 2A and 2B, each of the receivers 204A and 204B comprises a nonlinear distortion compensation circuit 104 and an adaptive nonlinear distortion modeling circuit 105. Each of the nonlinear distortion modeling circuits 105 attempts to estimate/reproduce at least some of the nonlinear distortion experienced by the signals received by its respective receiver.

In FIG. 2A, the outdoor units 208A and 208B demodulate and decode the signals from the satellite 202 and then retransmit the demodulated and decoded data to receivers 210A and 210B. In FIG. 2B, the outdoor units 208A and 208B simply downconvert the signals from the satellite 202 and then relay the signals to the respective receivers 210A and 210B.

In FIG. 2A, nonlinear distortion modeling circuit 105 in receiver 204A attempts estimate/reproduce the composite nonlinear distortion resulting from NL10 and NL11 that is seen by communications from the satellite 202 to the receiver 204A.

In FIG. 2A, nonlinear distortion modeling circuit 105 in receiver 210A attempts to estimate/reproduce the composite nonlinear distortion resulting from NL12 and NL13 that is seen by communications from the ODU 208A to the receiver 210A.

In FIG. 2A, nonlinear distortion modeling circuit 105 in receiver 204B attempts to estimate/reproduce the composite nonlinear distortion resulting from NL10 and NL14 that is seen by communications from the satellite 202 to the receiver 204B.

In FIG. 2A, nonlinear distortion modeling circuit 105 in receiver 210B attempts to estimate/reproduce the composite nonlinear distortion resulting from NL15 and NL16 that is seen by communications from the ODU 208B to the receiver 210B.

In FIG. 2B, nonlinear distortion modeling circuit 105 in receiver 210A attempts to estimate/reproduce the composite nonlinear distortion resulting from NL10, NL11, NL12, and NL13 that is seen by communications from the satellite 202 to the receiver 210A.

In FIG. 2B, nonlinear distortion modeling circuit 105 in receiver 210B attempts to estimate/reproduce the composite nonlinear distortion resulting from NL10, NL14, NL15, and NL16 that is seen by communications from the satellite 202 to the receiver 210B.

In instances that the satellite 202 relays signals from a hub 250, the nonlinear distortion (represented as NL17) may also be accounted for in the nonlinear distortion modeling circuits 105 of the ODUs (FIG. 2A) or the IDUs (FIG. 2B).

Figure 3A:
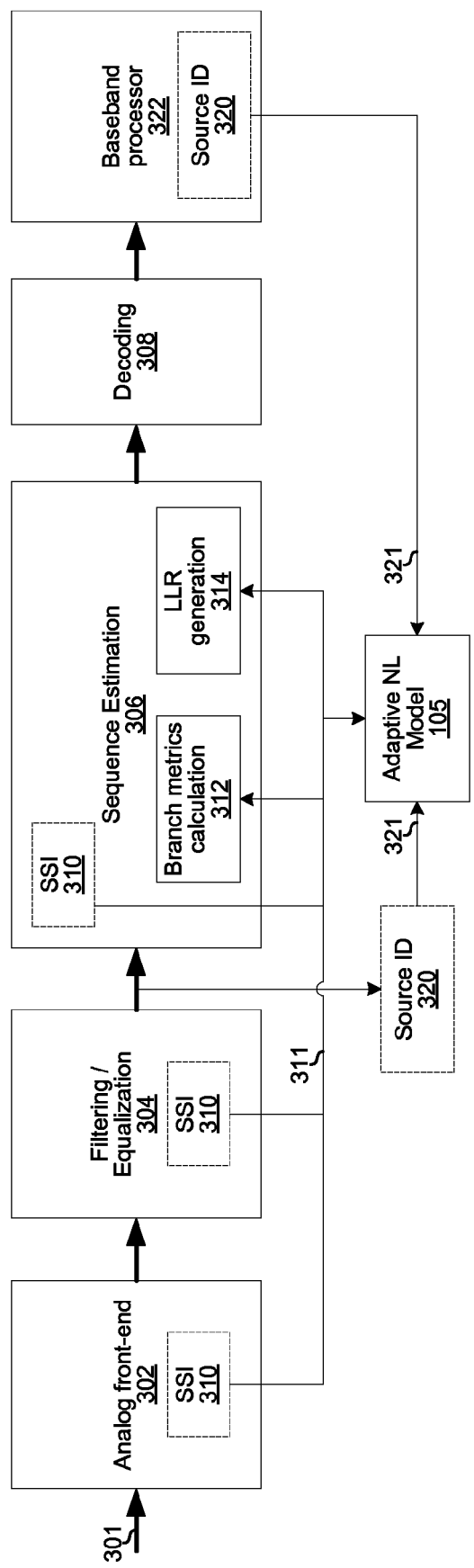
FIG. 3A depicts components of an example receiver for single-carrier communications in which adaptive nonlinear distortion models are used for improving communication performance.

FIG. 3A depicts components of an example receiver for single-carrier communications in which adaptive nonlinear distortion models are used for improving communication performance. Shown in FIG. 3A are an analog/RF front-end 302, a equalization/filtering circuit 304, a sequence estimation circuit 306, a decoding circuit 308 (e.g., FEC decoder), an adaptive nonlinear distortion modeling circuit 105, and a digital baseband processing circuit 322. The sequence estimation circuit 306 may perform functions of the nonlinear distortion compensation circuit 104

A signal strength indicator (SSI) circuit 310 may be implemented in the circuit 302, in the circuit 304, and/or in the circuit 306 and may output a signal 311 that is used to generate an indication 311 of the strength at which the received signal 301 was transmitted. In an example implementation, during the sequence estimation process performed by sequence estimation block 306, the SSI 310 may determine instantaneous transmit power for each sequence that is a candidate for being the transmitted symbol sequence that resulted in the received signal. That is, each candidate sequence is a known sequence from a known constellation and thus the instantaneous transmit power of the candidate at each symbol time is known. The instantaneous transmit power for a particular one or more candidates may be output as indication 311. Then, the instantaneous power for each particular candidate may be used for applying the nonlinear model to that particular candidate.

In an example implementation, the indication 311 may be used by the adaptive nonlinear distortion modeling circuit 105 to select which nonlinear distortion model parameter values to use for a particular candidate sequence. This may include, for example, selecting from among a plurality of sets of nonlinear distortion model parameter values maintained by the nonlinear distortion modeling circuit 105.

In an example implementation, the indication 311 may be used by sequence estimation circuit 306 to weight branch metrics and/or log-likelihood ratios generated in the sequence estimation circuit 306. Samples having very high signal strength may suffer from high nonlinear distortion which may not be accurately estimated/reproduced by circuit 105. Accordingly, branch metrics and/or log-likelihood ratios for such samples may be given less weight than other samples having moderate signal strength. Similarly, samples having very low signal strength may be very noisy. Accordingly, branch metrics and/or log-likelihood ratios for such samples may be given less weight than other samples having moderate signal strength.

The SSI 310 may be operable to measure signal strength over a band of frequencies that is wider than the desired channel. Information about signal strength on adjacent channels may be used to determine likely nonlinear distortion (e.g., nonlinear distortion may cause signals on the desired channel to spill over into adjacent channels) and/or interference on the desired channel and, accordingly, used for weighting branch metrics and/or log-likelihood ratios.

A source identification circuit 320 may be implemented as dedicated circuitry near the front-end of the receiver and/or in the digital baseband processing circuit 322. The source identification circuit 320 is operable to determine the source of a received signal and output an indication 321 of the identity of the determined source (e.g., indication 321 may be an IP address, MAC address, make and model number, and/or the like). The indication 321 may be used by the nonlinear distortion modeling circuit 105 to select which nonlinear distortion model parameter values to use for demodulating and decoding the signal from the determined source.

Figure 3B:
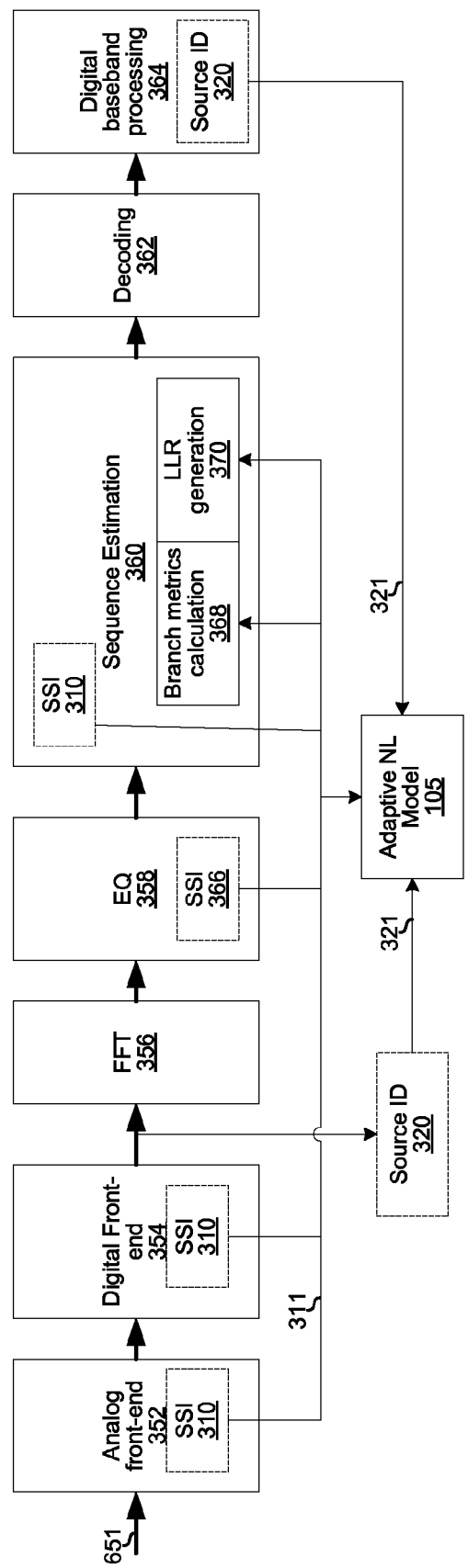
FIG. 3B depicts components of an example receiver for orthogonal frequency division multiplexed (OFDM) communications in which adaptive nonlinear distortion models are used for improving communication performance.

FIG. 3B depicts components of an example receiver for orthogonal frequency division multiplexed (OFDM) communications in which adaptive nonlinear distortion models are used for improving communication performance.

In the OFDM receiver of FIG. 3B, there is an SSI 310 as in FIG. 3A. Additionally, or alternatively, there may be an SSI 366 which may be operable to generate a per-OFDM subcarrier (or per-group-of-OFDM subcarriers) indication of transmitted signal strength. The signal strength indication(s) 311 from the SSI 310 and/or SSI 366 may be used by the sequence estimation circuit 360 to weight branch metrics and/or log-likelihood ratios similar to as described above with reference to FIG. 3A. In an example implementation, the signal strength indications(s) 311 from the SSI 310 and/or RSSI 366 may be used by the nonlinear distortion modeling circuit 105 to select which nonlinear distortion model parameter values to use for demodulating and decoding the subcarrier(s) corresponding to the signal strength indication.

In the OFDM receiver of FIG. 3B, there is a source identification circuit 320 as in FIG. 3A. The source identifiers 321 from the source identification circuit 320 may be used by the nonlinear distortion modeling circuit 105 to select which nonlinear distortion model parameter values to use for demodulating and decoding the subcarrier(s) from the identified source(s).

Figure 4:
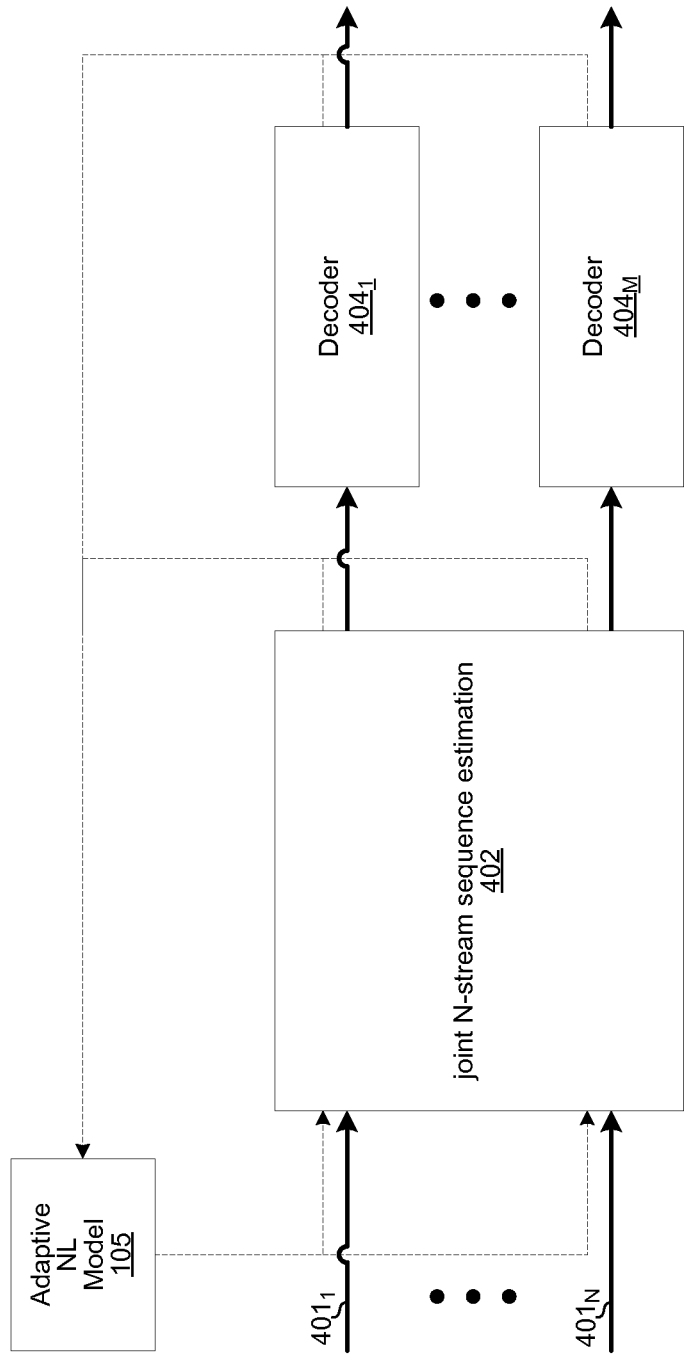
FIG. 4 depicts components of an example receiver operable to perform mutual sequence estimation of multiple concurrent streams using an adaptive nonlinear distortion model.

FIG. 4 depicts components of an example receiver operable to perform mutual sequence estimation of multiple concurrent streams using an adaptive nonlinear distortion model. Shown in FIG. 4 are a sequence estimation circuit 402 which is operable to jointly estimate N symbol streams. Each of the symbol streams $401_1$-$401_N$ (N is an integer) may experience the same nonlinear distortion en route to the sequence estimation circuit. Since each of the N streams experience the same nonlinear distortion, more streams may provide more information for adapting the nonlinear distortion model. As a result, the nonlinear distortion model may more accurately estimate/reproduce the actual nonlinear distortion experienced by the received streams, as compared to a single stream. Estimated symbols of each of M streams (M an integer less than or equal to N) output by sequence estimation circuit may be conveyed to a corresponding one of decoders $404_1$-$404_M$.

Figure 5:
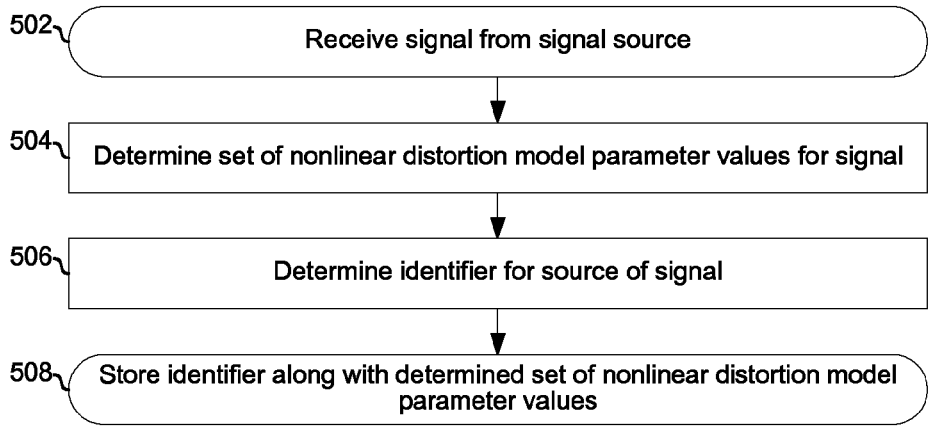
FIG. 5 is a flowchart illustrating an example process for determining nonlinear distortion model parameter values for a plurality of signal sources.

FIG. 5 is a flowchart illustrating an example process for determining nonlinear distortion model parameter values for a plurality of signal sources. In block 502, a receiver (e.g., 103) receives a signal from a signal source (e.g., transmitter 116a). In block 504, the receiver determines (e.g., using an adaptation/training algorithm) a set of nonlinear distortion model parameters using the received signal. In block 506, the receiver determines an identifier (e.g. MAC address) of the source of the received signal. In block 508, the receiver stores the determined set of nonlinear distortion model parameters to memory, and associates them in memory with the determined identifier.

Figure 6:
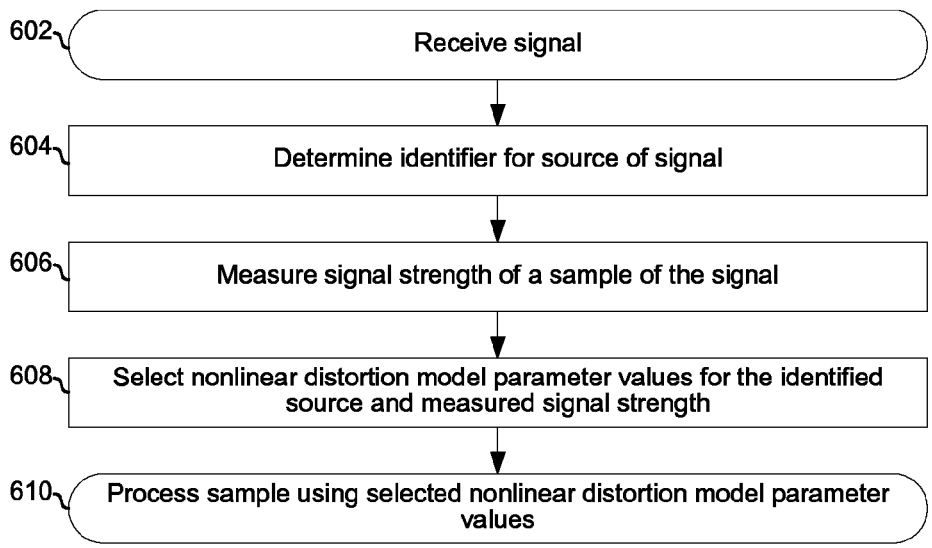
FIG. 6 is a flowchart illustrating an example process for handling nonlinear distortion in a multiuser environment.

FIG. 6 is a flowchart illustrating an example process for handling nonlinear distortion in a multiuser environment. In block 602, a receiver (e.g., 103) receives a signal from a signal source (e.g., transmitter 116a). In block 604, the receiver determines an identifier (e.g., MAC address or unique physical layer signaling signature) for the source of the signal. In block 606, the receiver generates an indication of transmitted signal strength for a sample of the received signal. In block 608, the receiver selects nonlinear distortion model parameter values based on the determined identifier and based on the strength indication for the sample. In block 610, the receiver processes the sample using the selected nonlinear distortion model parameter values.

In accordance with an example implementation of this disclosure, an electronic receiver (e.g., 103) comprises a nonlinear distortion modeling circuit (e.g., 105) and a nonlinear distortion compensation circuit (e.g., 104). The nonlinear distortion modeling circuit is operable to determine a plurality of sets of nonlinear distortion model parameter values, where each of the sets of nonlinear distortion model parameter values representing nonlinear distortion experienced by signals received by the electronic receiver from a respective one a plurality of communication partners. The nonlinear distortion compensation circuit is operable to use the sets of nonlinear distortion model parameter values for processing of signals from the plurality of communication partners. Each of the sets of nonlinear distortion model parameter values may comprise a plurality of values (e.g., 706) corresponding to a plurality of signal powers. The sets of nonlinear distortion model parameters may be stored in a lookup table (e.g., 702) indexed by a signal strength parameter (e.g., 704). The electronic receiver may comprise a received signal strength indicator circuit (e.g., 310) operable to generate an indication of transmitted signal strength for the received signal. The nonlinear distortion modeling circuit may be operable to select an entry of the lookup table based on the indication of transmitted signal strength. The sets of nonlinear distortion model parameters may be stored in a lookup table indexed by an identifier of signal source (e.g., by MAC address). The electronic receiver may comprise a source identification circuit (e.g., 320) operable to identify which one of the communication partners transmitted the signal. The nonlinear distortion modeling circuit may be operable to select which of the sets of nonlinear distortion model parameters to use for processing of the received signal based on the identification by the source identification circuit.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
an electronic receiver comprising:
a nonlinear distortion modeling circuit operable to determine a plurality of sets of nonlinear distortion model parameter values, each of said sets of nonlinear distortion model parameter values representing nonlinear distortion experienced by signals received by said electronic receiver from a respective one a plurality of communication partners; and
a nonlinear distortion compensation circuit operable to use said sets of nonlinear distortion model parameter values for processing of signals from said plurality of communication partners, wherein:

each of said sets of nonlinear distortion model parameter values comprises a plurality of values corresponding to a plurality of signal powers; and said sets of nonlinear distortion model parameters are stored in a lookup table indexed by a signal strength parameter.

2. The system of claim 1, wherein:

said electronic receiver comprises a signal strength indicator circuit operable to generate an indication of transmitted signal strength of a received signal; and said nonlinear distortion modeling circuit is operable to select an entry of said lookup table for processing of said received signal based on said indication of transmitted signal strength of said received signal.

3. The system of claim 1, wherein said sets of nonlinear distortion model parameters are stored in a lookup table indexed by an identifier of signal source.

4. The system of claim 1, said electronic receiver comprises a source identification circuit operable to identify which one of said plurality of communication partners transmitted a signal.

5. The system of claim 4, wherein said nonlinear distortion modeling circuit is operable to select which of said sets of nonlinear distortion model parameters to use for processing of a received signal based on said identification by said source identification circuit.

6. The system of claim 1, wherein said nonlinear distortion modeling circuit is operable to:

for each burst transmission received, determine which one of said sets of nonlinear distortion model parameter values to use for processing of said burst based on a preamble of said burst.

7. The system of claim 1, wherein:

each set of said plurality of sets of nonlinear distortion model parameter values corresponds to a respective one of a plurality of transmitters with which said electronic receiver communicates.

8. The system of claim 7, wherein said nonlinear distortion modeling circuit is operable to determine one of said sets of nonlinear distortion model parameter values for a particular one of said plurality of transmitters based on training signals sent during admission of said particular one of said transmitters to a network.

9. A system comprising:

an electronic receiver configured to communicate with a first communication partner and a second communication partner, wherein said electronic receiver comprises:

nonlinear distortion modeling circuitry operable to:

determine a first set of nonlinear distortion model parameter values that model nonlinear distortion present in signals from said first communication partner; and determine a second set of nonlinear distortion model parameter values that model nonlinear distortion present in signals from said second communication partner; and nonlinear distortion compensation circuitry operable to:

use said first set of nonlinear distortion model parameter values for processing of signals received from said first communication partner; and use said second set of nonlinear distortion model parameter values for processing of signals received from said second communication partner.

10. The system of claim 9, wherein said electronic receiver comprises source identification circuitry operable to generate an indication of whether a received signal originated from said first communication partner or said second communication partner.

11. The system of claim 10 wherein:

said nonlinear distortion modeling circuitry is operable to select between use of said first set of nonlinear distortion model parameter values and said second set of nonlinear distortion model parameter values for processing of said received signal; and said selection is based on said indication.

12. The system of claim 9, wherein said electronic receiver comprises signal strength indicator circuitry operable to generate an indication of transmitted signal strength of a signal received from said first communication partner.

13. The system of claim 12, wherein said nonlinear distortion modeling circuitry is operable to select between use of said first set of nonlinear distortion model parameter values and said second set of nonlinear distortion model parameter values for processing of a received signal; and said selection is based on said indication of transmitted signal strength.

14. The system of claim 9, wherein said first set of nonlinear distortion model parameters values and said second set of nonlinear distortion model parameters are stored in one or more lookup tables in said electronic receiver.

15. A method comprising:

in an electronic receiver:

determining, by a nonlinear distortion modeling circuit of said electronic receiver, a plurality of sets of nonlinear distortion model parameter values, each of said sets of nonlinear distortion model parameter values representing nonlinear distortion experienced by signals received by said electronic receiver from a respective one a plurality of communication partners;

processing, by a nonlinear distortion compensation circuit of said electronic receiver, signals from said plurality of communication partners using said sets of nonlinear distortion model parameter values; and storing said sets of nonlinear distortion model parameters in a lookup table of said electronic receiver, wherein said lookup table is indexed by a signal strength parameter.

16. A method comprising:

in an electronic receiver:

determining, by a nonlinear distortion modeling circuit of said electronic receiver, a plurality of sets of nonlinear distortion model parameter values, each of said sets of nonlinear distortion model parameter values representing nonlinear distortion experienced by signals received by said electronic receiver from a respective one a plurality of communication partners;

processing, by a nonlinear distortion compensation circuit of said electronic receiver, signals from said plurality of communication partners using said sets of nonlinear distortion model parameter values; and storing said sets of nonlinear distortion model parameters in a lookup table of said electronic receiver, wherein said lookup table is indexed by an identifier of signal source.

17. A system comprising:

an electronic receiver comprising:

a nonlinear distortion modeling circuit operable to determine a plurality of sets of nonlinear distortion model parameter values, each of said sets of nonlinear distortion model parameter values representing nonlinear distortion experienced by signals received by said electronic receiver from a respective one a plurality of communication partners; and
a nonlinear distortion compensation circuit operable to use said sets of nonlinear distortion model parameter values for processing of signals from said plurality of communication partners, wherein said sets of nonlinear distortion model parameters are stored in a lookup table indexed by an identifier of signal source.

18. The system of claim 17, wherein each of said sets of nonlinear distortion model parameter values comprises a plurality of values corresponding to a plurality of signal powers.

19. The system of claim 17, wherein:
each of said sets of nonlinear distortion model parameter values comprises a plurality of values corresponding to a plurality of signal powers;
said sets of nonlinear distortion model parameters are stored in a lookup table indexed by a signal strength parameter;
said electronic receiver comprises a signal strength indicator circuit operable to generate an indication of transmitted signal strength of a received signal; and
said nonlinear distortion modeling circuit is operable to select an entry of said lookup table for processing of said received signal based on said indication of transmitted signal strength of said received signal.

20. The system of claim 17, wherein said electronic receiver comprises a source identification circuit operable to identify which one of said plurality of communication partners transmitted a signal.

21. The system of claim 20, wherein said nonlinear distortion modeling circuit is operable to select which of said sets of nonlinear distortion model parameters to use for processing of a received signal based on said identification by said source identification circuit.

22. The system of claim 17, wherein said nonlinear distortion modeling circuit is operable to:
for each burst transmission received, determine which one of said sets of nonlinear distortion model parameter values to use for processing of said burst based on a preamble of said burst.

23. The system of claim 17, wherein:
each set of said plurality of sets of nonlinear distortion model parameter values corresponds to a respective one of a plurality of transmitters with which said electronic receiver communicates.

24. The system of claim 23, wherein said nonlinear distortion modeling circuit is operable to determine one of said sets of nonlinear distortion model parameter values for a particular one of said plurality of transmitters based on training signals sent during admission of said particular one of said plurality of transmitters to a network.

25. A system comprising:
an electronic receiver comprising:
a nonlinear distortion modeling circuit operable to determine a plurality of sets of nonlinear distortion model parameter values, each of said sets of nonlinear distortion model parameter values representing nonlinear distortion experienced by signals received by said electronic receiver from a respective one a plurality of communication partners;
a nonlinear distortion compensation circuit operable to use said sets of nonlinear distortion model parameter values for processing of signals from said plurality of communication partners; and
a source identification circuit operable to identify which one of said plurality of communication partners transmitted a signal.

26. The system of claim 25, wherein each of said sets of nonlinear distortion model parameter values comprises a plurality of values corresponding to a plurality of signal powers.

27. The system of claim 25, wherein:
each of said sets of nonlinear distortion model parameter values comprises a plurality of values corresponding to a plurality of signal powers;
said sets of nonlinear distortion model parameters are stored in a lookup table indexed by a signal strength parameter;
said electronic receiver comprises a signal strength indicator circuit operable to generate an indication of transmitted signal strength of a received signal; and
said nonlinear distortion modeling circuit is operable to select an entry of said lookup table for processing of said received signal based on said indication of transmitted signal strength of said received signal.

28. The system of claim 25, wherein said nonlinear distortion modeling circuit is operable to select which of said sets of nonlinear distortion model parameters to use for processing of a received signal based on said identification by said source identification circuit.

29. The system of claim 25, wherein said nonlinear distortion modeling circuit is operable to:
for each burst transmission received, determine which one of said sets of nonlinear distortion model parameter values to use for processing of said burst based on a preamble of said burst.

30. the system of claim 25, wherein:
each set of said plurality of sets of nonlinear distortion model parameter values corresponds to a respective one of a plurality of transmitters with which said electronic receiver communicates.

31. The system of claim 30, wherein said nonlinear distortion modeling circuit is operable to determine one of said sets of nonlinear distortion model parameter values for a particular one of said plurality of transmitters based on training signals sent during admission of said particular one of said plurality of transmitters to a network.

32. A system comprising:
an electronic receiver comprising:
a nonlinear distortion modeling circuit operable to determine a plurality of sets of nonlinear distortion model parameter values, each of said sets of nonlinear distortion model parameter values representing nonlinear distortion experienced by signals received by said electronic receiver from a respective one a plurality of communication partners; and
a nonlinear distortion compensation circuit operable to:
use said sets of nonlinear distortion model parameter values for processing of signals from said plurality of communication partners; and
for each burst transmission received, determine which one of said sets of nonlinear distortion model parameter values to use for processing of said burst based on a preamble of said burst.

33. The system of claim 32, wherein:
each of said sets of nonlinear distortion model parameter values comprises a plurality of values corresponding to a plurality of signal powers;
said sets of nonlinear distortion model parameters are stored in a lookup table indexed by a signal strength parameter;
said electronic receiver comprises a signal strength indicator circuit operable to generate an indication of transmitted signal strength of a received signal; and said nonlinear distortion modeling circuit is operable to select an entry of said lookup table for processing of said received signal based on said indication of transmitted signal strength of said received signal.

34. The system of claim 32, wherein:
said electronic receiver comprises a source identification circuit operable to identify which one of said plurality of communication partners transmitted a signal; and
said nonlinear distortion modeling circuit is operable to select which of said sets of nonlinear distortion model parameters to use for processing of a received signal based on said identification by said source identification circuit.

35. The system of claim 32, wherein:
each set of said plurality of sets of nonlinear distortion model parameter values corresponds to a respective one of a plurality of transmitters with which said electronic receiver communicates.

36. The system of claim 35, wherein said nonlinear distortion modeling circuit is operable to determine one of said sets of nonlinear distortion model parameter values for a particular one of said plurality of transmitters based on training signals sent during admission of said particular one of said plurality of transmitters to a network.

37. A system comprising:
an electronic receiver comprising:
a nonlinear distortion modeling circuit operable to determine a plurality of sets of nonlinear distortion model parameter values, each of said sets of nonlinear distortion model parameter values representing nonlinear distortion experienced by signals received by said electronic receiver from a respective one a plurality of communication partners; and
a nonlinear distortion compensation circuit operable to use said sets of nonlinear distortion model parameter values for processing of signals from said plurality of communication partners, wherein:
each set of said plurality of sets of nonlinear distortion model parameter values corresponds to a respective one of a plurality of transmitters with which said electronic receiver communicates; and
said nonlinear distortion modeling circuit is operable to determine one of said sets of nonlinear distortion model parameter values for a particular one of said plurality of transmitters based on training signals sent during admission of said particular one of said plurality of transmitters to a network.

38. The system of claim 37, wherein each of said sets of nonlinear distortion model parameter values comprises a plurality of values corresponding to a plurality of signal powers.

39. The system of claim 37, wherein:
each of said sets of nonlinear distortion model parameter values comprises a plurality of values corresponding to a plurality of signal powers;
said sets of nonlinear distortion model parameters are stored in a lookup table indexed by a signal strength parameter;
said electronic receiver comprises a signal strength indicator circuit operable to generate an indication of transmitted signal strength of a received signal; and
said nonlinear distortion modeling circuit is operable to select an entry of said lookup table for processing of said received signal based on said indication of transmitted signal strength of said received signal.

40. The system of claim 37, wherein:
said electronic receiver comprises a source identification circuit operable to identify which one of said plurality of communication partners transmitted a signal; and
said nonlinear distortion modeling circuit is operable to select which of said sets of nonlinear distortion model parameters to use for processing of a received signal based on said identification by said source identification circuit.

\* \* \* \* \*